United States Patent
Parrish et al.

(10) Patent No.: US 8,755,988 B2
(45) Date of Patent: Jun. 17, 2014

(54) METHOD FOR METERING A FUEL MASS USING A CONTROLLABLE FUEL INJECTOR

(75) Inventors: Scott E. Parrish, Farmington Hills, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1157 days.

(21) Appl. No.: 12/707,082

(22) Filed: Feb. 17, 2010

(65) Prior Publication Data

US 2011/0197851 A1    Aug. 18, 2011

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *F02B 3/00* | (2006.01) |

(52) U.S. Cl.
USPC ............................. 701/104; 123/299

(58) Field of Classification Search
USPC ............. 73/114.45, 114.48, 114.49; 123/299, 123/478, 480, 486; 701/103, 104, 114, 115, 701/106; 702/182
See application file for complete search history.

(56) References Cited

U.S. PATENT DOCUMENTS

| | | | |
|---|---|---|---|
| 6,340,014 B1* | 1/2002 | Tomita et al. ................. | 123/295 |
| 7,881,857 B2* | 2/2011 | Samenfink et al. ........... | 701/105 |
| 2003/0083801 A1* | 5/2003 | Mollin ........................ | 701/104 |
| 2008/0099573 A1* | 5/2008 | Parrish ............................. | 239/5 |
| 2010/0236520 A1* | 9/2010 | Ito ............................ | 123/406.19 |

OTHER PUBLICATIONS

U.S. Appl. No. 12/369,086. "Method for Controlling a Spark-Ignition Direct-Injection Internal Combustion Engine At Low Loads" First Inventor: Nicole Wermuth.

* cited by examiner

*Primary Examiner* — Stephen K Cronin
*Assistant Examiner* — Sizo Vilakazi

(57) ABSTRACT

A method for controlling a direct-injection fuel injector for an internal combustion engine includes identifying linear and non-linear fuel mass delivery regions corresponding to predefined ranges of injection duration, monitoring an operator torque request, determining a total desired fuel mass associated with the operator torque request, identifying a fuel mass delivery region corresponding to the total desired fuel mass, and commanding a plurality of partial injection events having injection durations corresponding to the linear fuel mass delivery region to inject the total desired fuel mass when the total desired fuel mass corresponds to the non-linear fuel mass delivery region.

20 Claims, 4 Drawing Sheets

METHOD FOR METERING A FUEL MASS USING A CONTROLLABLE FUEL INJECTOR

TECHNICAL FIELD

This disclosure is related to controllable fuel injectors.

BACKGROUND

The statements in this section merely provide background information related to the present disclosure and may not constitute prior art.

Electronic fuel injection is a known method for fuel delivery in compression-ignition and spark-ignition internal combustion engines. A fuel injector can be a solenoid-actuated or piezo-electric valve device mounted on an engine and positioned to deliver pressurized fuel into a combustion chamber of an engine cylinder. Each injector is preferably energized during each combustion cycle for a period of time, i.e., injection duration, determined based upon pre-calibrated parameters for engine operating conditions. Multiple fuel injection events can occur each combustion cycle for each cylinder.

Known fuel injectors have linear and non-linear regions of fuel mass delivery with respect to injection duration. The linear regions of fuel mass delivery include commanded injection durations, having corresponding known and unique fuel mass deliveries at a predetermined fuel pressure. Linear regions of fuel mass delivery include regions whereat fuel mass delivery increases monotonically with increased injection durations at constant fuel pressure.

The non-linear regions of fuel mass delivery include commanded injection durations having unknown or unpredictable fuel mass deliveries at a predetermined fuel pressure, including non-monotonic regions whereat the fuel injector can deliver the same fuel mass quantity at different injection durations. Boundaries of the linear and non-linear regions may vary in different fuel injector systems.

SUMMARY

A method for controlling a direct-injection fuel injector for an internal combustion engine includes identifying linear and non-linear fuel mass delivery regions corresponding to pre-defined ranges of injection duration, monitoring an operator torque request, determining a total desired fuel mass associated with the operator torque request, identifying a fuel mass delivery region corresponding to the total desired fuel mass, and commanding a plurality of partial injection events having injection durations corresponding to the linear fuel mass delivery region to inject the total desired fuel mass when the total desired fuel mass corresponds to the non-linear fuel mass delivery region.

BRIEF DESCRIPTION OF THE DRAWINGS

One or more embodiments will now be described, by way of example, with reference to the accompanying drawings, in which.

DETAILED DESCRIPTION

Figure 1:
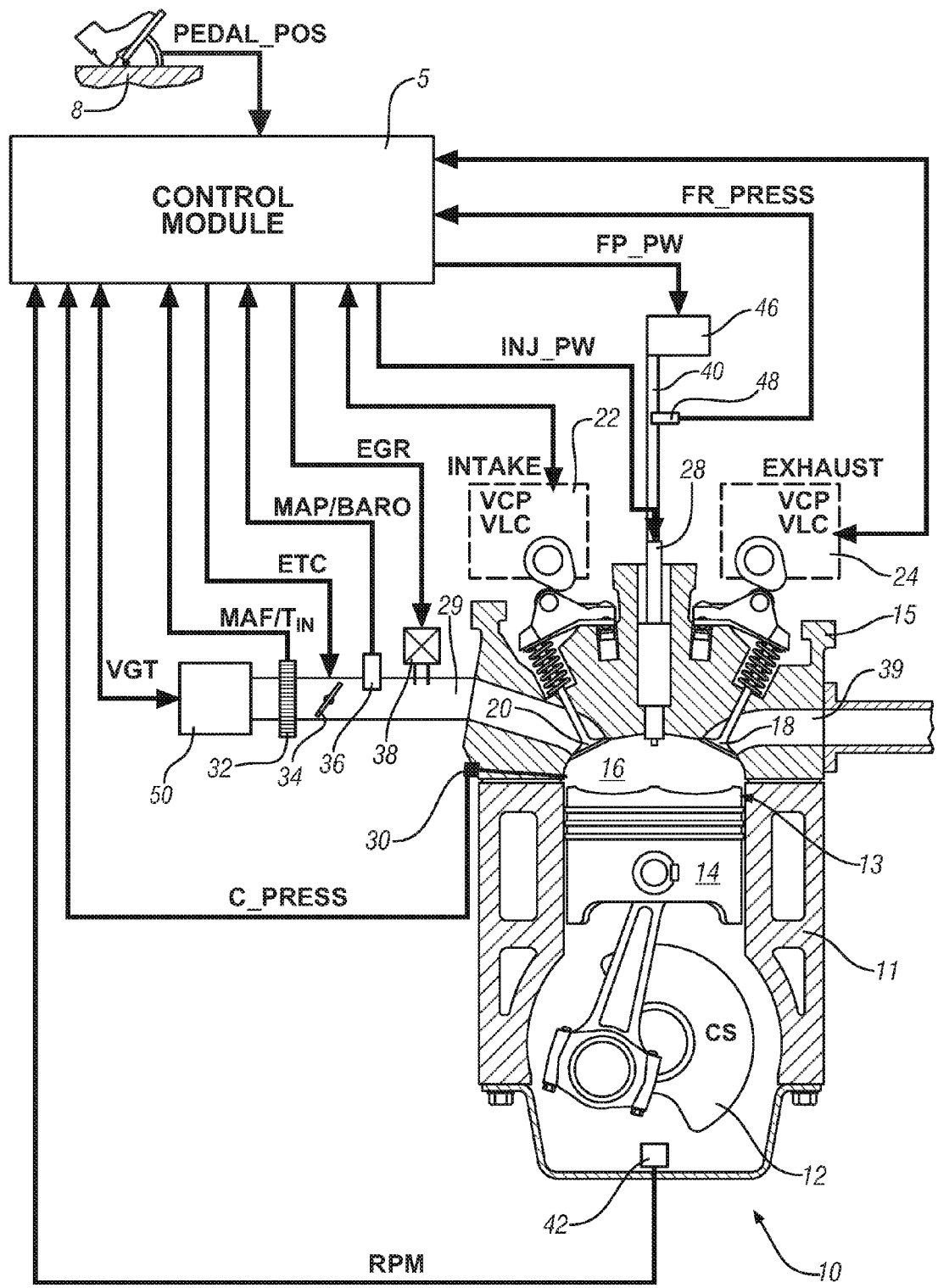
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and an intermediate stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature ($MAF/T_{IN}$). A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure (MAP/BARO). An external flow passage recirculates exhaust gases from engine exhaust to the intake manifold 29, having a flow control valve referred to as an exhaust gas recirculation (EGR) valve 38. The engine 10 can include other systems, including a turbocharger system 50 or, alternatively, a supercharger system to deliver pressurized intake air to the engine 10. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system including a plurality of high-pressure fuel injectors 28 each configured to directly inject a mass of fuel into one of the combustion chambers 16 in response to a signal (INJ_PW), i.e., a pulsewidth, from the control module 5. The fuel injectors 28 are supplied pressurized fuel from a fuel distribution system including a common fuel rail 40 in one embodiment. A pressure sensor 48 monitors fuel rail pressure within the fuel rail 40 and outputs a signal (FR_PRESS) corresponding to the fuel rail pressure to the control module 5 in one embodiment.

The fuel distribution system preferably includes a high pressure (e.g., 200 bar/20 MPa) fuel pump 46 to deliver pressurized fuel to the fuel injector 28 via the fuel rail 40. The control module 5 determines a preferred fuel rail pressure (FP_PW) based on an operator torque request and the engine speed and controlled via fuel pump 46. The fuel injector 28 preferably includes one of a solenoid-actuated and piezoelectric-actuated device having a nozzle placed through an opening in the cylinder head 15 to inject pressurized fuel into the combustion chamber 16. The injector nozzle includes a fuel injector tip characterized by a number of openings, a spray angle, and a flow number representing a volumetric flow rate at a given pressure. An exemplary fuel injector nozzle includes a 8-hole device having a 70 degree spray angle and a flow rate of 10 cc/s@100 bar. Fuel injector operating characteristics are described with reference to FIG. 2.

A pressure sensor 30 monitors in-cylinder pressure within the cylinder 13, having a signal output (C_PRESS) which is monitored by the control module 5. The pressure sensor 30 can include a pressure transducer that translates the in-cylinder pressure level to an electric signal. The pressure sensor 30 monitors in-cylinder pressure in real-time, including during each combustion event.

The control module 5 commands a start of injection (hereafter SOI) corresponding to position of the piston 14 (SOI angle) via input from the crank sensor 42 during ongoing operation of the engine 10. The SOI angle is the crank angle at which the fuel injector 28 is actuated to inject fuel into the combustion chamber 16. The SOI angle is measured relative to a top-dead-center (TDC) position of the crankshaft 12, at which the piston 14 is at a highest position of travel within the combustion chamber 16 correlating to a minimum volume of the combustion chamber 16.

In the exemplary engine 10, the control module 5 commands a fuel injection event using the fuel injector 28 for each combustion event for each cylinder 13. Injection events are defined by injection duration and injected fuel mass. In one embodiment, the control module 5 commands a main fuel injection event during each combustion event. The fuel mass of the main fuel injection event is selected by the control module 5 based on the operator torque request. The control module 5 monitors input signals from an operator, for example, through a position of an accelerator pedal 8 (PEDAL_POS) to determine the operator torque request.

The engine 10 preferably includes a spark-ignition system by which spark energy can be provided to a spark plug for igniting or assisting in igniting cylinder charges in each of the combustion chambers 16 in response to a signal from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion event. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 controls the throttle valve 34 to control mass flow of intake air into the engine via control signal ETC. In one embodiment, the throttle valve 34 is commanded to wide open throttle and the turbocharger system 50 is utilized to control manifold pressure by modifying both an intake air quantity and a recirculated exhaust gas quantity. The turbocharger system 50 preferably includes a variable geometry turbine device. The control module 5 sends a signal (VGT) to direct the angle of vanes of the variable geometry turbine device. The angle of the vanes is measured with a VGT position sensor to provide feedback control to the control module 5. By controlling the angle of the vanes of the variable geometry turbine device, the control module 5 controls the level of pressure boost thereby controlling the intake air quantity and the recirculated exhaust gas quantity. In alternate embodiments, a supercharger system can be utilized to modify the manifold pressure in analogous fashion.

The control module 5 controls exhaust gas quantity by controlling opening of the exhaust gas recirculation valve 38 via control signal EGR. By controlling opening of the exhaust gas recirculation valve 38, the control module 5 controls a recirculated exhaust gas rate and the ratio of exhaust gas quantity to intake gas quantity.

Figure 2:
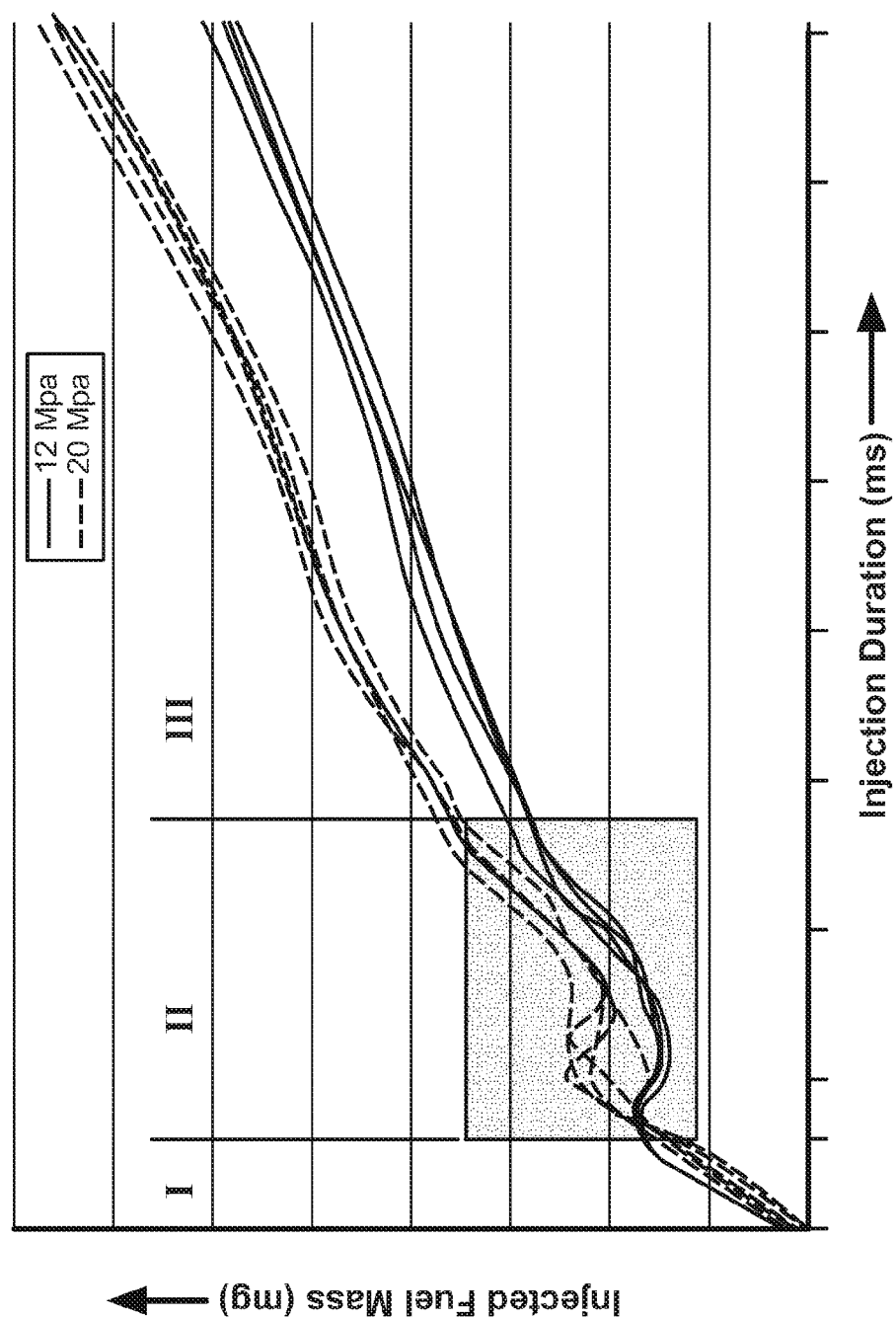
FIG. 2 graphically illustrates fuel mass delivery of an exemplary fuel injector over a range of injection durations at different fuel rail pressures, in accordance with the present disclosure.

FIG. 2 shows a data graph illustrating injected fuel mass (mg) from an exemplary fuel injector 28 over a range of injection durations at fuel rail pressures of 12 MPa and 20 MPa. As FIG. 2 shows, each fuel injector 28 has linear and non-linear injected fuel mass delivery regions corresponding to injection duration. The linear and non-linear injected fuel mass regions corresponding to predefined ranges of injection duration are identified for a particular hardware application preferably experimentally determined and based upon flow characteristics of the fuel injector 28 and the fuel rail pressure. Regions I and III depict injection durations that have a linear delivery of injected fuel mass. Linear delivery of injected fuel mass includes operation whereat the injected fuel mass increases monotonically with increased injection duration. Region II depicts injection durations that have a non-linear delivery of injected fuel mass. Non-linear delivery of injected fuel mass includes operation whereat the injected fuel mass does not increase monotonically with increased injection duration. A fuel injection event in a linear fuel mass delivery region results in a known and unique fuel mass delivery corresponding to a known injection duration.

Region I corresponds to injection events having injection durations resulting in partial opening of the fuel injectors 28, i.e., injection durations whereat the fuel injectors 28 do not fully open. Region I is characterized by injection durations, in milliseconds, that have corresponding injected fuel mass (mg) at a known fuel pressure. Injection durations associated with Region I can be predetermined and may be adjusted according to operational responses of the fuel injectors 28 during ongoing operation. In one embodiment, Region I corresponds to injection events including injection durations and fuel mass that are less than injection duration and fuel mass of injection events corresponding to a non-linear fuel mass delivery region.

Region II corresponds to injection events having injection durations resulting in full or partial opening of the fuel injectors 28, and the injection durations can be associated with reaching and maintaining a full lift condition in the fuel injector 28. Region II is characterized by injection durations, in milliseconds, that may or may not increase monotonically with increased injection duration.

When the total desired fuel mass to inject during a combustion event corresponds to injection durations that are within Region II, the total desired fuel mass can be achieved by commanding a plurality of injection events during the combustion event wherein each injection duration corresponds to Region I.

Region III corresponds to injection events having injection durations resulting in full opening of the fuel injectors 28, i.e., injection durations whereat the fuel injectors open completely. Region III is characterized by injection durations, in milliseconds, that have corresponding injected fuel mass (mg) at a known fuel pressure. Injection durations associated with Region III can be predetermined and may be adjusted according to operational responses of the fuel injectors 28 during ongoing operation.

Figure 3:
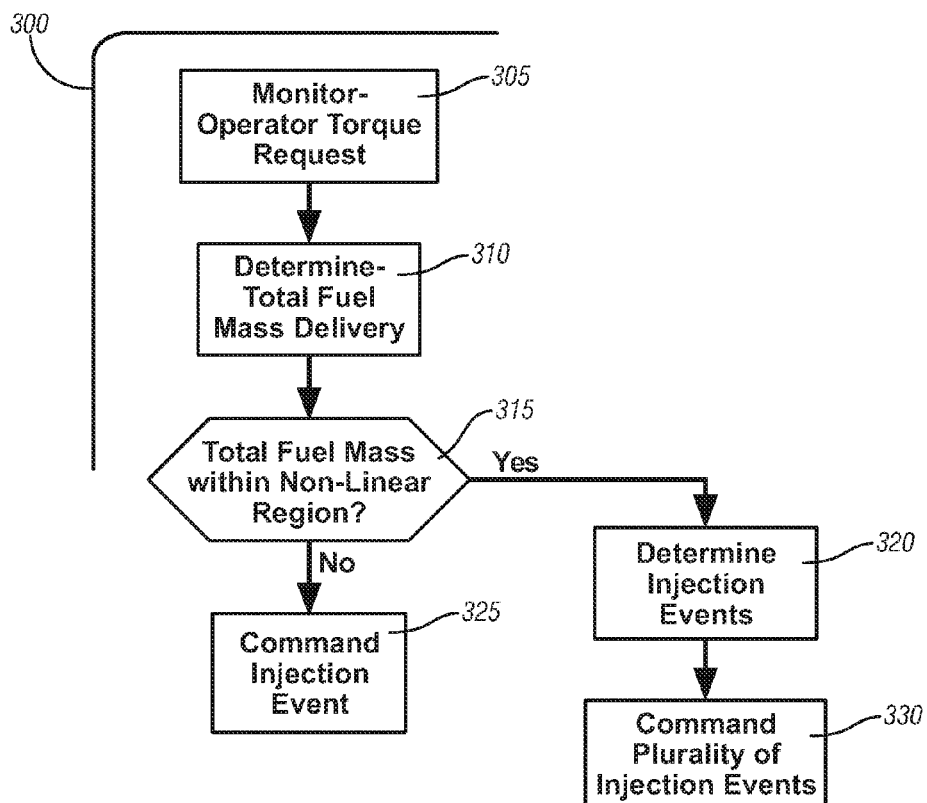
FIG. 3 is a control flowchart, in accordance with the present disclosure.

FIG. 3 is a control scheme 300 for controlling operation of the fuel injectors 28 to meter fuel to the engine 10 in response to an operator torque request. The control scheme 300 is illustrated in FIG. 3, and described herein as including discrete elements. Such illustration is for ease of description and it should be recognized that the functions performed by these elements may be combined in one or more devices, e.g., implemented in software, hardware, and/or application-specific integrated circuitry. For example, the control scheme 300 may be executed as one or more algorithms in the control module 5. The control scheme 300 includes monitoring the operator torque request (305), and determining a total desired fuel mass associated with the operator torque request for each of the fuel injectors 28 (310). The control scheme 300 determines whether the total desired fuel mass is within a predefined non-linear fuel mass delivery region (315). If not, a single injection event is commanded to meter fuel to achieve the total desired fuel mass (325). If so, the control scheme 300 apportions the total desired fuel mass into a plurality of partial injection events each metering a partial fuel mass corresponding to one of the predefined linear fuel mass delivery regions (320). After determining the fuel mass for each of the plurality of partial injection events, the control scheme 300 commands the fuel injectors 28 to achieve the total desired fuel mass by executing the plurality of partial injection events (330). Each injection event as described herein is characterized by an injection duration and associated injected fuel mass of the fuel injector 28.

The control scheme 300 determines whether the total desired fuel mass is within a predefined non-linear fuel mass delivery region based upon the predefined linear and non-linear fuel mass delivery regions (315). As described hereinabove the fuel injectors 28 operate at injection duration that includes linear and non-linear fuel mass delivery regions. The fuel mass delivery regions such as Regions I, II, and III are graphically illustrated in FIG. 2, are defined by injected fuel mass and injection duration. In operation, the control scheme 300 locates the fuel mass delivery region corresponding to the total desired fuel mass and determines whether the fuel mass delivery region is in one of the linear regions, e.g., Regions I and III in one embodiment, or a non-linear region, e.g., Region II in one embodiment.

When the total desired fuel mass corresponds to one of the predefined linear fuel mass regions, e.g., Regions I and III in one embodiment, a single injection event is commanded to meter fuel to achieve the total desired fuel mass (325). When the total desired fuel mass corresponds to one of the predefined non-linear fuel mass delivery regions, e.g., Region II in one embodiment, the total desired fuel mass is apportioned into a plurality of partial injection events each metering a partial fuel mass including a portion of the total desired fuel mass. The control scheme 300 apportions the total desired fuel mass when it is determined that the total desired fuel mass corresponds to one of the predefined non-linear fuel mass delivery regions (320). Each of the partial injection events meters a fuel mass that is associated with one of the predefined linear fuel mass delivery regions, e.g., Region I. The control module 5 actuates each fuel injector 28 for the plurality of partial injection events to achieve the total desired fuel mass (330). The cumulative sum of the partial fuel masses delivered during the partial injection events is the total desired fuel mass.

A first method for apportioning the total desired fuel mass into a plurality of partial injection events (320) each metering a partial fuel mass to deliver the total desired fuel mass includes dividing the total desired fuel mass into a plurality of partial injection events each metering an equal fuel mass. The non-linear fuel mass delivery region may be divided into a plurality of predetermined fuel mass ranges, each range associated with a predetermined quantity of partial injection events. The control scheme 300 selects the predetermined fuel mass range corresponding to the total desired fuel mass to determine the quantity of partial injection events. The total desired fuel mass is divided into the quantity of partial injection events to determine the fuel mass of each partial injection event, each metering an equal fuel mass. For example, for a total desired fuel mass corresponding to the non-linear fuel mass delivery region, e.g., between 3 mg and 9 mg corresponding to Region II in one embodiment, two predetermined fuel mass ranges may be defined. A first predetermined fuel mass range may include the fuel mass range between 3 mg and 6 mg, and a second predetermined fuel mass range may include the fuel mass range between 6 mg and 9 mg in one embodiment. The total desired fuel mass between 3 mg and 6 mg may be divided into two partial injection events each metering an equal fuel mass, and a total desired fuel mass delivery between 6 mg and 9 mg may be divided into three partial injection events each metering an equal fuel mass. Alternatively, the total desired fuel mass can be divided by increasing quantities of partial injection events until a resulting fuel mass is associated with one of the linear fuel mass delivery regions, e.g., Region I, resulting in a plurality of partial injection events each metering an equal fuel mass.

Figure 4:
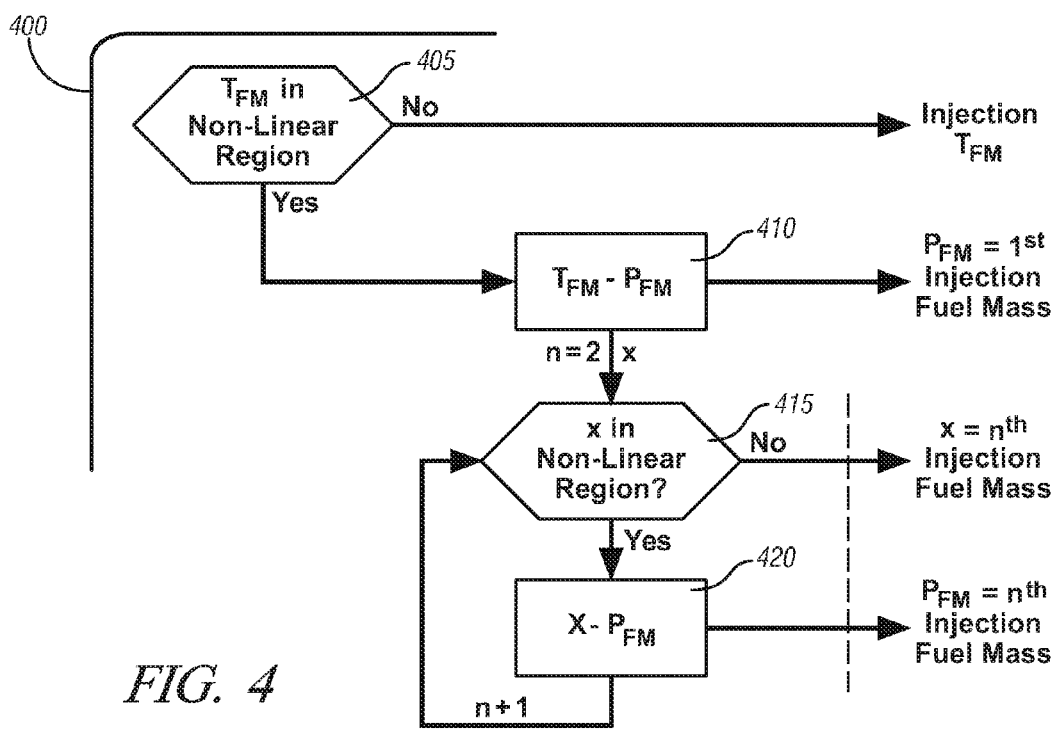
FIG. 4 is a control flowchart, in accordance with the present disclosure.

FIG. 4 shows a second method 400 for apportioning the total desired fuel mass into a plurality of partial injection events each metering a partial fuel mass corresponding to one of the predefined linear fuel mass delivery regions (320) using the control scheme 300 described herein above. The second method 400 includes determining whether the total desired fuel mass ($T_{FM}$) is within a non-linear fuel mass region (405). If the total desired fuel mass $T_{FM}$ is not within the non-linear fuel mass region, the $T_{FM}$ is injected as a single injection event. If the total desired fuel mass $T_{FM}$ is within the non-linear fuel mass region, a predetermined fuel mass point ($P_{FM}$) is subtracted from the total desired fuel mass $T_{FM}$ (410). Preferably, the predetermined fuel mass point is a maximum fuel mass located in fuel mass delivery region, e.g., Region I. The predetermined fuel mass delivery point is designated as a first partial fuel mass ($1^{st}$ Injection Fuel Mass), and the control scheme 300 determines whether the resultant (x) is within the non-linear fuel mass delivery region (415). When the resultant (x) is not within the non-linear fuel mass delivery region, the resultant is an ($n^{th}$) partial fuel mass ($n^{th}$ Injection Fuel Mass). If the resultant is within the non-linear fuel mass delivery region, the predetermined fuel mass point is subtracted from the resultant (420). The predetermined fuel mass point is designated as an ($n^{th}$) partial fuel mass ($n^{th}$ Injection Fuel Mass), and step 415 is repeated after incrementing n.

Alternatively, the control scheme 300 may apportion the total desired fuel mass by dividing the predetermined fuel mass point $P_{FM}$ into the total desired fuel mass. The resultant is a quotient and, unless the quotient is a whole number, there is a remainder. The remainder may be truncated from the quotient and multiplied with the predetermined fuel mass point $P_{FM}$. The resultant is a remaining fuel mass for a remaining partial injection event. The truncated quotient or the whole number is a number of partial injection events wherein each of the partial injection events has an associated fuel mass delivery substantially equal to the predetermined fuel mass delivery point $P_{FM}$. The remaining partial injection event and the quantity of partial injection events including the predetermined fuel mass delivery point $P_{FM}$ may be injected in any order during a combustion cycle.

A third method for apportioning the total desired fuel mass into a plurality of partial injection events each metering a partial fuel mass corresponding to one of the predefined linear fuel mass delivery regions (320) includes selecting preset partial injection events based upon the total desired fuel mass delivery. An array of fuel masses associated with a total desired fuel mass and corresponding to a predetermined plurality of partial injection events that have been apportioned can be generated based upon the linear and non-linear fuel mass delivery regions. The array is preferably associated with total desired fuel masses with Region II, and can be stored in a predetermined lookup table. The control scheme 300 locates the total desired fuel mass in the lookup table and selects the corresponding partial injection event. The corresponding partial injection events may be predetermined and calibrated according to test results corresponding to a particular hardware application.

After the total desired fuel mass is apportioned into a plurality of partial injection events, the control scheme 300 actuates the fuel injectors 28 (330). Each partial injection event has an associated fuel mass injection and injection duration. The injection duration may be predetermined and calibrated according to test results corresponding to a particular hardware application and for dwell time dynamics as described hereinbelow. Dwell time refers to a time period between injection events, including partial injection events, whereat no fuel is delivered by one of the injectors 28. Dwell time dynamics refers electro-mechanical response characteristics and fuel flow characteristics that affect openings and closings of each fuel injector 28 in response to a pulsewidth signal from the control module 5, thus affecting fuel delivery during each injection event and total fuel mass delivered over a plurality of partial injection events.

A plurality of partial injection events can result in injection events that are contiguous or include intermediate dwell times. For contiguous injection events, e.g., where there is minimal or no dwell time between injection events, latter occurring partial injection events may have an increased injected fuel mass per injection duration as compared to earlier occurring partial injection events of the same duration. For example, a first fuel injection event for a given injection duration will result in a first quantity of injected fuel mass and a subsequent fuel injection event after a short dwell time may result in a greater quantity of injected fuel mass than the first fuel injection event for the same given injection duration.

In another embodiment, actuation of the fuel injectors 28 are determined based upon the total desired fuel mass and the linear and non-linear regions described hereinabove. The control module 5 stores a predetermined lookup table in memory indexed by total desired fuel mass corresponding to the non-linear region. The total desired fuel mass in the lookup table includes equal injection durations of the fuel injectors 28. The equal injection durations are predetermined and may be adapted according to operational responses of the fuel injectors 28 during actuation and for short dwell time dynamics as described hereinabove. In operation, the control module 5 locates the total desired fuel mass in the lookup table and determines the equal injection durations corresponding to the total desired fuel mass.

Figure 5:
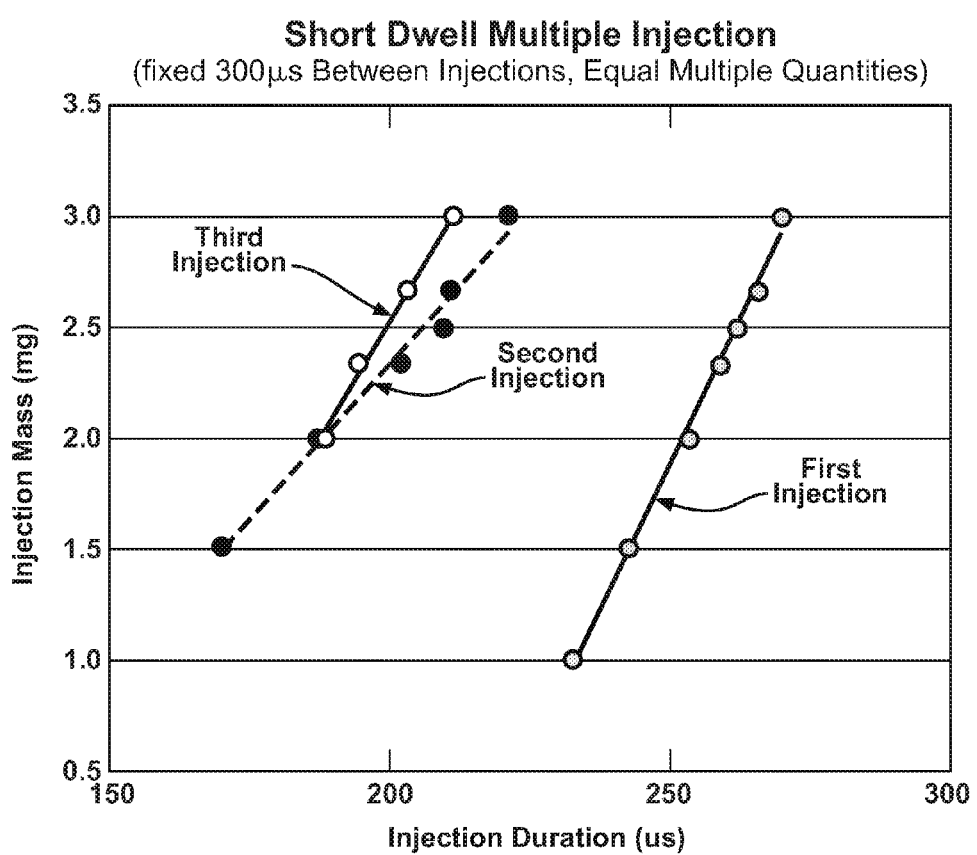
FIG. 5 graphically illustrates fuel mass injections over a range of injection durations using a method for determining partial fuel mass delivery events, in accordance with the present disclosure.

FIG. 5 shows a data graph illustrating results of fuel mass injections over a range of injection durations using the first method for determining the partial fuel mass events. Three fuel mass partial injection events were determined for a total desired fuel mass between 6 mg and 9 mg, two fuel mass partial injection events were determined for a total desired fuel mass delivery between 3 mg and 6 mg, and one fuel mass delivery injection event was determined for a total desired fuel mass between 0 mg and 3 mg. A first partial fuel injection event (First Injection) ranged from fuel mass between 1 mg to 3 mg, a second partial injection event (Second Injection) ranged from 1.5 mg to 3 mg, and a third partial injection event (Third Injection) ranged from 2 mg to 3 mg. As the data graph shows, a linear relationship between desired fuel mass delivery and injection duration results, thus enabling the control scheme 300 to accurately inject desired quantities of fuel mass from a range of 0 mg to 9 mg.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a direct-injection fuel injector for an internal combustion engine, the method comprising:
   identifying linear and non-linear fuel mass delivery regions corresponding to predefined ranges of injection duration;
   monitoring an operator torque request;
   determining a total desired fuel mass associated with the operator torque request;
   identifying a fuel mass delivery region corresponding to the total desired fuel mass comprising:
      selecting the total desired fuel mass to be delivered in a single injection event;
      determining an injection duration corresponding to the selected total desired fuel mass to be delivered in the single injection event; and
      identifying whether the determined injection duration delivered in the single injection event corresponds to one of a non-linear fuel mass delivery region defined by a minimum injection duration and a maximum injection duration and a linear fuel mass delivery region defined by an injection duration being either one of less than the minimum injection duration and greater than the maximum injection duration; and
   commanding a plurality of partial injection events having injection durations corresponding to the linear fuel mass delivery region to inject the total desired fuel mass only when the injection duration corresponding to the selected total desired fuel mass to be delivered in the single injection event corresponds to the non-linear fuel mass delivery region.

2. The method of claim 1, further comprising:
   apportioning the total desired fuel mass into the plurality of partial injection events each metering a partial fuel mass associated with the linear fuel mass delivery region.

3. The method of claim 2, wherein apportioning the total desired fuel mass into the plurality of partial injection events comprises:
   dividing the total desired fuel mass into a plurality of partial injection events each having an equal fuel mass and wherein the partial injection events correspond to the linear fuel mass delivery region.

4. The method of claim 3, further comprising:
   associating predetermined fuel mass ranges within the non-linear fuel mass delivery region with a quantity of partial injection events;
   selecting the predetermined fuel mass range that is associated with the total desired fuel mass;
   determining the quantity of partial injection events associated with the selected predetermined fuel mass range; and
   dividing the total desired fuel mass into the quantity of partial injection events to determine a fuel mass for each of the quantity of partial injection events.

5. The method of claim 3, wherein dividing the total desired fuel mass into the quantity of partial injection events comprises dividing the total desired fuel mass by increasing quantities of partial injection events until a resulting fuel mass is associated with the linear fuel mass delivery region.

6. A method for controlling a direct-injection fuel injector for an internal combustion engine, the method comprising:
   identifying linear and non-linear fuel mass delivery regions corresponding to predefined ranges of injection duration;
   monitoring an operator torque request;
   determining a total desired fuel mass associated with the operator torque request;
   identifying a fuel mass delivery region corresponding to the total desired fuel mass;
   commanding a plurality of partial injection events having injection durations corresponding to the linear fuel mass delivery region to inject the total desired fuel mass when the total desired fuel mass corresponds to the non-linear fuel mass delivery region;
   apportioning the total desired fuel mass into the plurality of partial injection events each metering a partial fuel mass associated with the linear fuel mass delivery region, comprising:
      dividing a predetermined fuel mass delivery point into the total desired fuel mass to determine a quotient;
      truncating any remainder from the quotient wherein a resultant is a quantity of partial injection events wherein each of the quantity of partial injection events comprises a fuel mass substantially equal to the predetermined fuel mass delivery point; and multiplying the remainder with the predetermined fuel mass delivery point to determine a remaining fuel mass delivery for a remaining fuel injection event.

7. The method of claim 6, wherein the predetermined fuel mass delivery point is a fuel mass delivery point associated with a fuel mass delivery region corresponding to injection events comprising injection durations and fuel mass that are less than injection duration and fuel mass of injection events corresponding to the non-linear fuel mass delivery region.

8. A method for controlling a direct-injection fuel injector for an internal combustion engine, the method comprising:
identifying linear and non-linear fuel mass delivery regions corresponding to predefined ranges of injection duration;
monitoring an operator torque request;
determining a total desired fuel mass associated with the operator torque request;
identifying a fuel mass delivery region corresponding to the total desired fuel mass;
commanding a plurality of partial injection events having injection durations corresponding to the linear fuel mass delivery region to inject the total desired fuel mass when the total desired fuel mass corresponds to the non-linear fuel mass delivery region;
apportioning the total desired fuel mass into the plurality of partial injection events each metering a partial fuel mass associated with the linear fuel mass delivery region, comprising:
referencing a lookup table indexed by fuel masses associated with a total desired fuel mass and corresponding to a predetermined plurality of partial injection events based upon the linear and non-linear fuel mass delivery regions;
locating the total desired fuel mass in the lookup table; and
selecting from the lookup table a corresponding plurality of partial injection events to achieve the total desired fuel mass.

9. The method of claim 1, wherein the direct-injection fuel injector is one of a solenoid-actuated and a piezo-electric valve device.

10. The method of claim 1, wherein the non-linear fuel mass delivery region comprises a non-monotonic region.

11. The method of claim 1, comprising executing the plurality of partial injection events contiguously.

12. The method of claim 1, further comprising:
commanding an intermediate dwell time between each of the plurality of partial injection events.

13. A method for controlling a direct-injection fuel injector for an internal combustion engine, the method comprising:
identifying linear and non-monotonic fuel mass delivery regions corresponding to predefined ranges of injection duration;
monitoring an operator torque request;
determining a total desired fuel mass based upon the operator torque request;
identifying the fuel mass delivery region corresponding to the total desired fuel mass comprising:
selecting the total desired fuel mass to be delivered in a single injection event;
determining an injection duration corresponding to the selected total desired fuel mass to be delivered in the single injection event; and
identifying whether the determined injection duration delivered in the single injection event corresponds to one of the non-monotonic fuel mass delivery region defined by a minimum injection duration and a maximum injection duration and a linear fuel mass delivery region defined by an injection duration being either one of less than the minimum injection duration and greater than the maximum injection duration; and
apportioning the total desired fuel mass into a plurality of partial injection events only when the injection duration corresponding to the selected total desired fuel mass to be delivered in the single injection event corresponds to the non-monotonic fuel mass delivery region; and
commanding the plurality of partial injection events.

14. The method of claim 13, wherein each of the plurality of partial injection event corresponds to the linear fuel mass delivery region.

15. The method of claim 14, wherein apportioning the total desired fuel mass comprises:
dividing the total desired fuel mass into the plurality of partial injection events having equal fuel mass, wherein the partial injection events having equal fuel mass correspond to the linear fuel mass delivery region.

16. The method of claim 14, wherein apportioning the total desired fuel mass comprises:
associating a plurality of predetermined fuel mass ranges within the non-monotonic fuel mass delivery region with a predetermined quantity of partial injection events;
selecting the predetermined fuel mass range that is associated with the total desired fuel mass;
determining the quantity of partial injection events associated with the selected predetermined fuel mass range; and
dividing the total desired fuel mass into the quantity of partial injection events to determine a fuel mass for each of the quantity of partial injection events.

17. A method for controlling a direct-injection fuel injector for an internal combustion engine, the method comprising:
identifying linear and non-monotonic fuel mass delivery regions corresponding to predefined ranges of injection duration;
monitoring an operator torque request;
determining a total desired fuel mass based upon the operator torque request;
identifying the fuel mass delivery region corresponding to the total desired fuel mass;
apportioning the total desired fuel mass into a plurality of partial injection events corresponding to the linear fuel mass delivery region when the total desired fuel mass corresponds to the non-monotonic fuel mass delivery region, comprising:
dividing a predetermined fuel mass delivery point into the total desired fuel mass to determine a quotient;
truncating any remainder from the quotient wherein a resultant is a quantity of partial injection events wherein each of the quantity of partial injection events comprises a fuel mass substantially equal to the predetermined fuel mass delivery point; and
multiplying the remainder with the predetermined fuel mass delivery point to determine a remaining fuel mass delivery for a remaining fuel injection event; and
commanding the plurality of partial injection events.

18. A method for controlling a direct-injection fuel injector for an internal combustion engine, the method comprising:
identifying linear and non-linear fuel mass delivery regions corresponding to predefined ranges of injection duration;
monitoring an operator torque request;
determining a total desired fuel mass based upon the operator torque request;

identifying the fuel mass delivery region corresponding to the total desired fuel mass comprising:
  selecting the total desired fuel mass to be delivered in a single injection event;
  determining an injection duration corresponding to the selected total desired fuel mass to be delivered in the single injection event; and
  identifying whether the determined injection duration delivered in the single injection event corresponds to one of a non-linear fuel mass delivery region defined by a minimum injection duration and a maximum injection duration and a linear fuel mass delivery region defined by an injection duration being either one of less than the minimum injection duration and greater than the maximum injection duration; and
determining a plurality of contiguous partial injection events corresponding to the linear fuel mass delivery region to achieve the total desired fuel mass only when the injection duration corresponding to the selected total desired fuel mass to be delivered in the single injection event corresponds to the non-linear fuel mass delivery region, wherein the linear fuel mass delivery region corresponds to injection events comprising injection durations that are less than injection durations of injection events corresponding to the non-linear fuel mass delivery region; and
commanding the plurality of contiguous partial injection events.

19. The method of claim 18, wherein determining the plurality of contiguous partial injection events comprises:
  associating predetermined fuel mass ranges within the non-linear fuel mass delivery region with a quantity of partial injection events;
  selecting the predetermined fuel mass range that is associated with the total desired fuel mass;
  determining the quantity of partial injection events associated with the selected predetermined fuel mass range; and
  dividing the total desired fuel mass into the quantity of partial injection events to determine a fuel mass for each of the quantity of partial injection events.

20. A method for controlling a direct-injection fuel injector for an internal combustion engine, the method comprising:
  identifying linear and non-linear fuel mass delivery regions corresponding to predefined ranges of injection duration;
  monitoring an operator torque request;
  determining a total desired fuel mass based upon the operator torque request;
  identifying the fuel mass delivery region corresponding to the total desired fuel mass;
  determining a plurality of contiguous partial injection events based upon the total desired fuel mass comprising:
    dividing a predetermined fuel mass delivery point into the total desired fuel mass to determine a quotient;
    truncating any remainder from the quotient wherein a resultant is a quantity of partial injection events wherein each of the quantity of partial injection events comprises a fuel mass substantially equal to the predetermined fuel mass delivery point; and
    multiplying the remainder with the predetermined fuel mass delivery point to determine a remaining fuel mass delivery for a remaining fuel injection event; and
  commanding the plurality of contiguous partial injection events corresponding to the linear fuel mass delivery region to achieve the total desired fuel mass when the total desired fuel mass corresponds to the non-linear fuel mass delivery region wherein the linear fuel mass delivery region corresponds to injection events comprising injection durations and fuel mass that are less than injection duration and fuel mass of injection events corresponding to the non-linear fuel mass delivery region.

* * * * *